United States Patent [19]
Becker

[11] 4,387,267
[45] Jun. 7, 1983

[54] DEVICE FOR THE FLUID-TIGHT ANCHORAGE OF AN ELECTRIC CONDUCTING CABLE INLET

[75] Inventor: Gérard Becker, Roupeldange, France
[73] Assignee: Societe Industrielle de Boulay, Boulay, France
[21] Appl. No.: 250,301
[22] Filed: Apr. 2, 1981
[30] Foreign Application Priority Data
Apr. 8, 1980 [FR] France .............................. 80 07831
[51] Int. Cl.³ .................... F16L 21/02; H02G 15/013
[52] U.S. Cl. ................................ 174/65 SS; 277/110; 285/343
[58] Field of Search .................... 174/65 SS; 285/353, 285/354, 356, 357, 343; 277/110, 112

[56] References Cited
U.S. PATENT DOCUMENTS

| | | | |
|---|---|---|---|
| 1,712,273 | 5/1929 | Kennedy | 285/343 X |
| 2,466,527 | 4/1949 | Wolfram | 285/343 |
| 4,250,348 | 2/1981 | Kitagawa | 285/343 X |

FOREIGN PATENT DOCUMENTS 2554827 7/1976 Fed. Rep. of Germany ...... 285/356

Primary Examiner—Laramie E. Askin
Assistant Examiner—D. A. Tone
Attorney, Agent, or Firm—Wenderoth, Lind & Ponack

[57] ABSTRACT

This device for the fluid-tight anchorage of an electric conducting cable, for example through an inlet aperture formed in a cabinet, box or the like, comprises a tubular body through which the cable is passed, such body consisting of two sections adapted to be screwed onto each other. One of these sections includes the one means such as a packing ring for sealing the cable inlet and the other section includes means such as a socket formed with radial longitudinal slots for anchoring the cable inlet. The packing ring and the socket face each other so that, when the body sections are tightened by screwing, the ring and socket engage each other, and consequently the action exerted on the ring and on the socket by their interaction is reinforced by this tightening movement.

5 Claims, 4 Drawing Figures

DEVICE FOR THE FLUID-TIGHT ANCHORAGE OF AN ELECTRIC CONDUCTING CABLE INLET

BACKGROUND OF THE INVENTION

This invention relates in general to electric cable inlet means and has specific reference to an improved device intended for jointly sealing and anchoring an electric conducting cable penetrating through the wall of a cabinet, box or equivalent structure.

Various devices have already been proposed in this field. These known devices comprise as a rule a tubular body made of two sections adapted to be assembled by screwing one section into the other, the electric cable to be anchored passing in a fluid-tight manner through this body. A seal, generally in the form of a gasket of resilient material, and an anchoring member generally in the form of a slotted socket having fitted therein means such as a packing ring, are disposed in the body. Thus, when the two body sections are screwed in relation to each other the slotted socket undergoes a certain distortion causing in turn the compression of the packing ring against the cable surface. However, the cable anchoring and sealing action obtained by using these known devices is not fully satisfactory. In most cases the anchoring action is such that the cable surface is damaged. Moreover, the efficiency of the slotted split socket is not sufficient, as far as the action exerted thereby on the seal is concerned. Finally, the mere act of pulling the cable is sufficient to impair the anchorage thereof.

SUMMARY OF THE INVENTION

It is therefore the primary object of the present invention to provide a device of the type broadly set forth hereinabove for anchoring and sealing a cable passing through a cable inlet or lead-in of a cabinet, box or the like, which device is free of the above-mentioned inconveniences and further characterised by the following specific advantageous features:

The device of the present invention has a maximum gripping capacity, in that it is adaptable to a relatively wide range of cable diameters. In all cases the anchorage obtained with this device is a positive one and the cable is safely prevented from slipping in the device and thus jeopardizing the cable connections.

The device of this invention comprises a very small number of component elements.

Finally, the over-all dimensions of the device are extremely reduced and the device itself can be fitted without using special tools.

The device constituting the subject matter of the present invention comprises a substantially tubular body through which the cable is passed, this body consisting of two sections adapted to be assembled by screwing. One of the sections includes one means such as a packing ring, and the other section includes means, such as a socket in which spaced longitudinal radial slots are formed, for anchoring the cable. The device further is characterised in that the slotted anchoring socket and the packing ring face each other and contact each other, when the assembly is tightened, so that when the two sections are tightened by screwing they reinforce the sealing action exerted on the packing ring and on the socket through the action produced by one of these members on the other.

According to another feature characterizing this invention, the slotted socket comprises an external bead formed with a bevelled outer surface registering with a bevelled inner surface formed on the body portion engaged by the socket, the taper of the bead bevel differing from that of the inner bevel of the body portion.

With this arrangement, in actual service the socket is clamped radially inwardly to grip the cable and thus anchor the same from the very beginning of the mutual screwing of the two sections of the device.

According to a further feature characterizing this invention, the face of the socket bead registering with the packing ring is also tapered, thus improving the efficiency of the thrust exerted on the slotted socket by the screwing movement of one section of the device with respect to the other section.

It is a further feature of this invention that the anchoring socket is fitted in a bore of a length such that the socket is allowed to move axially therein either when the parts are screwed in relation to each other or when the cable is pulled.

These various features and advantages characterizing the present invention will appear more clearly as the following description proceeds with reference to the accompanying drawings showing an exemplary embodiment of the cable anchoring and sealing device of this invention, given by way of illustration, not of limitation, it being understood that other shapes, proportions and arrangements could be devised by those skilled in the art without departing from the basic principles of the invention.

DESCRIPTION OF THE PREFERRED EMBODIMENT

The device for the fluid-tight anchorage of an electric conducting cable inlet according to the present invention, notably of cables 1 and 1' of different diameters, for example through the wall of a cabinet or box (not shown) comprises two main tubular sections A and B through which the cable 1 or 1' is passed, these two sections being provided with matching female and male threaded portions, as shown.

Section A is adapted to provide the necessary fluid-tightness with the assistance of a packing, packing-ring, sealing ring or the like a, made of elastic or deformable material. Furthermore, section A has a preferably bevelled sealing surface $a_1$ engageable by the packing ring or the like element a.

Adapted to be screwed into section A is the other section B acting somewhat in the fashion of a stuffing-box gland and having a cylindrical bore b having a bevelled inlet edge $b_1$ (see FIG. 2) and a rear shoulder c acting as a stop. Fitted in bore b is a cylindrical socket d of deformable material, in which radial longitudinal slots $d_1$ are formed to impart the necessary flexibility thereto.

Thus, according to the present invention, the packing ring a or like seal and the slotted socket d are disposed in face to face relationship. The advantages deriving from this specific arrangement will be discussed presently.

At its end facing the ring a the socket d an outwardly extending annular bead. As clearly shown in FIGS. 3 and 4, this bead has two bevelled faces one $d_2$ directed towards the bore b and the other towards the packing ring a. When the device is tightened, as shown more particularly in FIG. 4 face $d_2$ engages the tapered surface $b_1$ at the inlet end of bore b.

According to a specific feature characterizing this invention, the taper of the bevelled face $d_2$ which is adjacent the bore b differs from the bevel of the end edge $b_1$ of this bore. In the example illustrated, the angle of the bevelled face $d_2$ to a plane perpendicular to the axis of the device is 30°, and the angle of the end bevel $b_1$ to this plane is 45°. With this arrangement, from the very beginning of the relative tightening movements of the two sections A and B toward each other the socket d undergoes a distortion causing the socket to pivot somewhat towards the cable surface, so as to firmly grip the latter at m and anchor the device to the cable without damaging the cable surface. As the tightening action is continued, this distortion is completed by the relative sliding movements of the two bevelled faces $d_2$ and $b_1$ toward each other (see FIG. 4), so that the cable will be forcibly gripped by the socket at n, the latter being allowed to move axially in the bore b due to the sufficient length imparted thereto.

Figure 3:
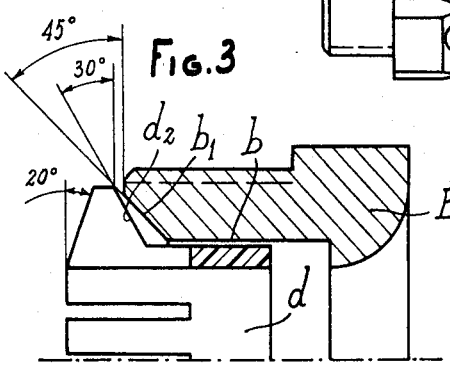
FIGS. 3 and 4 are fragmentary sectional views showing parts of the same device on a larger scale.
Figure 4:
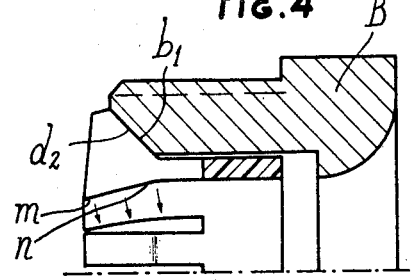

Also according to this invention and as shown in FIGS. 3 and 4, the outer face of the bead of socket d, instead of being rectilinear, is tapered and registers with the packing ring a. The taper angle of this outer face may be about 20° and its purpose is to improve the efficiency of the thrust exerted on the slotted socket when the two sections are tightened on each other, thus promoting the distortion, by pivoting about itself, of the socket and also the mutual sliding engagement of the two bevelled faces of the socket and of the bore in which the socket is axially movable.

The screwing of sections A and B on each other causes a pressure to be exerted not only on the slotted socket d but also on the packing ring or seal a, whereby the latter, due to the pressure exerted by the tapered inner surface $a_1$ of section A, is forced against the cable 1 or 1'. From the foregoing, it is clear that, with the arrangement of this invention, combined and simultaneous actions, namely a sealing action through seal a and an anchoring through ring d acting as an anchoring member, are obtained.

In addition, the action exerted on the packing ring and on the anchor ring is further reinforced by the mutual forces developed between these two component elements.

This combined action is effective irrespective of the cable diameter. From the very beginning of the tightening movement, for example of section B on section A, an efficient anchoring and sealing action is obtained.

Figure 1:
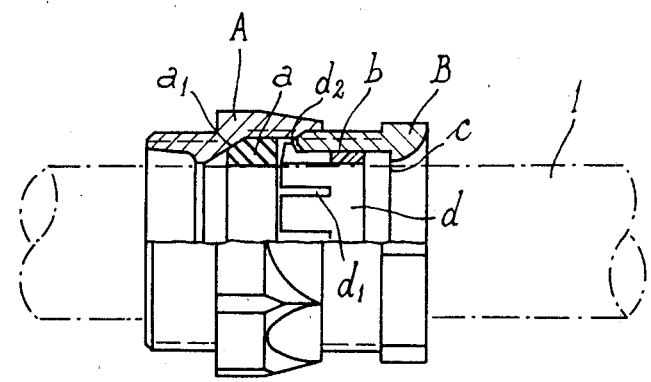
FIG. 1 is a fragmentary longitudinal section and side-elevational view showing the relative positions of the component elements of the device before the elements in screw engagement with each other are tightened.
Figure 2:
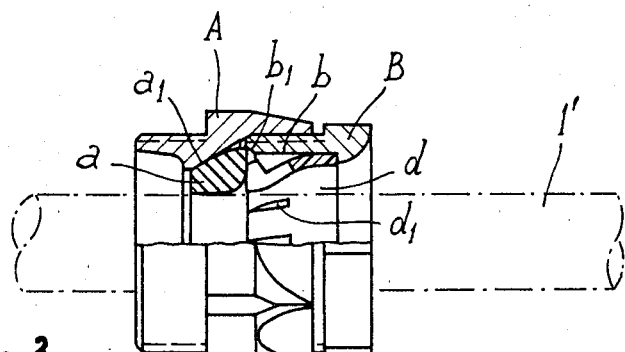
FIG. 2 is a view similar to FIG. 1 but showing the same device after the tightening thereof on a cable of minimum diameter.

In the case illustrated in FIG. 2, illustrating by way of example a cable 1' of smaller diameter than that of FIG. 1, the interaction obtaining between these two means has the same strength and the distortion of one member assists strongly in the distortion of the other member for eventually producing a particularly efficient sealing and anchoring action. In this case, the anchoring ring, under the thrust exerted by the packing ring, will abut the rear shoulder c of the bore of section B.

It is another advantageous feature of this invention that, even with a relatively moderate tightening action, the device is self-locking when the cable is pulled, without any risk of damaging the cable surface.

From the foregoing, it will be readily understood that considerable advantages are derived from this invention.

Firstly, this device is characterized by a substantial clamping capacity, and also by a reliable fluid-tightness and a perfect anchorage.

This result is obtained by using a particularly simple device comprising a minimum number of component elements that are easily assembled without resorting to special tools while excluding any possibility of faulty positioning of the component elements.

Moreover, the over-all dimensions of the device of the present invention are particularly reduced.

Last but not least, and as already mentioned in the foregoing, when tightened this device is self-locking. In other words, when a tractive effort is exerted on the device fitted in position, the only consequence is its increased efficiency. To sum up the device of this invention is of the positive action type, in contrast to hitherto known devices proposed in this specific field.

Of course, as already mentioned hereinabove, many modifications may be made to the embodiment shown and described herein without departing from the basic principles of the invention, notably in connection with the materials implemented in the manufacture of its component elements, with the shape, notably the internal configuration, of the body sections A and B, and also of the sealing and anchoring means thereof.

Thus, for instance, a completely cylindrical packing ring a may be substituted for the bevelled one illustrated. In this case, the body section A engaged by this ring shall be provided with a shoulder adapted to engage the packing ring.

What I claim is:

1. A device for the simultaneous sealing and anchoring of an electric conducting cable in an inlet of a structure, said device comprising:

a tubular body through which an electric cable is to be passed, said body including first and second sections having mutually engageable threads so that said sections may be moved relatively axially of each other;

said first section having positioned inwardly thereof flexible, sealing ring means for, upon axial movement of said sections toward each other, sealing radially inwardly against the electric cable;

said second section having positioned inwardly thereof anchor means for, upon axial movement of said sections toward each other, clamping radially inwardly against the electric cable, said anchor means comprising a socket formed of flexible material and having therein a plurality of circumferentially spaced, radially and axially extending slots;

said sealing ring means and said socket being in axial end-to-end relationship to each other such that, upon axial movement of said sections toward each other, said sealing ring means and said socket are moved into direct end-to-end engagement with each other; and said second section and said socket having means for, upon axial movement of said sections toward each other, simultaneously reinforcing the sealing action on said sealing ring means and the clamping action on said socket by the interaction between said sealing ring means and said socket due to end-to-end engagement therebetween, said reinforcing means comprising a bevelled end face on said second section, a bead extending outwardly from said socket, and a first bevelled surface on said bead, said first bevelled surface facing said bevelled end face and being contacted thereby upon axial movement of said sections toward each other, and the tapers of said first bevelled surface and said bevelled end face being different when out of mutual engagement with each other.

2. A device as claimed in claim 1, wherein said first bevelled surface is tapered at an angle of approximately 30° to a plane extending transverse to the axis of said body, and said bevelled end face is tapered at an angle of approximately 45° to said plane.

3. A device as claimed in claims 1 or 2, further comprising a second bevelled surface on said bead at a position facing said sealing ring means and in contact therewith when said sections are moved axially toward each other.

4. A device as claimed in claim 3, wherein said second bevelled surface is tapered at an angle of approximately 20° to a plane extending transverse to the axis of said body, when said socket is out of mutual engagement with the end surface of said sealing ring means.

5. A device as claimed in claim 1, wherein said second section has therein a recessed axially extending bore within which is positioned said socket, said bore having an axial dimension sufficient to enable axial movement therein of said socket during axial movement of said sections toward each other.

* * * * *